July 6, 1926.
R. SIDEMAN
AUTO FENDER
Filed March 17, 1926      3 Sheets-Sheet 2
1,591,407
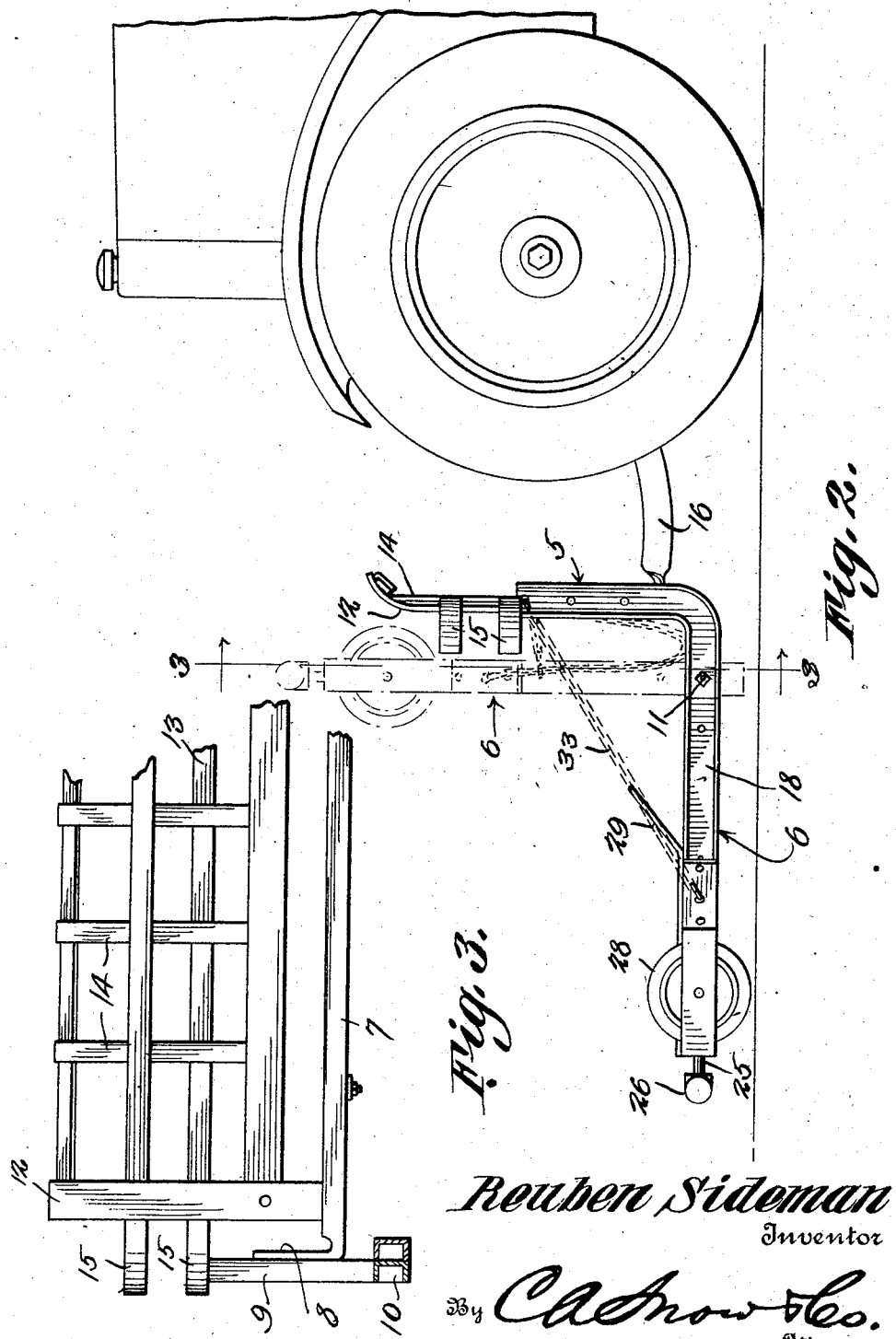
Reuben Sideman
Inventor
By C.A.Snow&Co.
Attorneys.

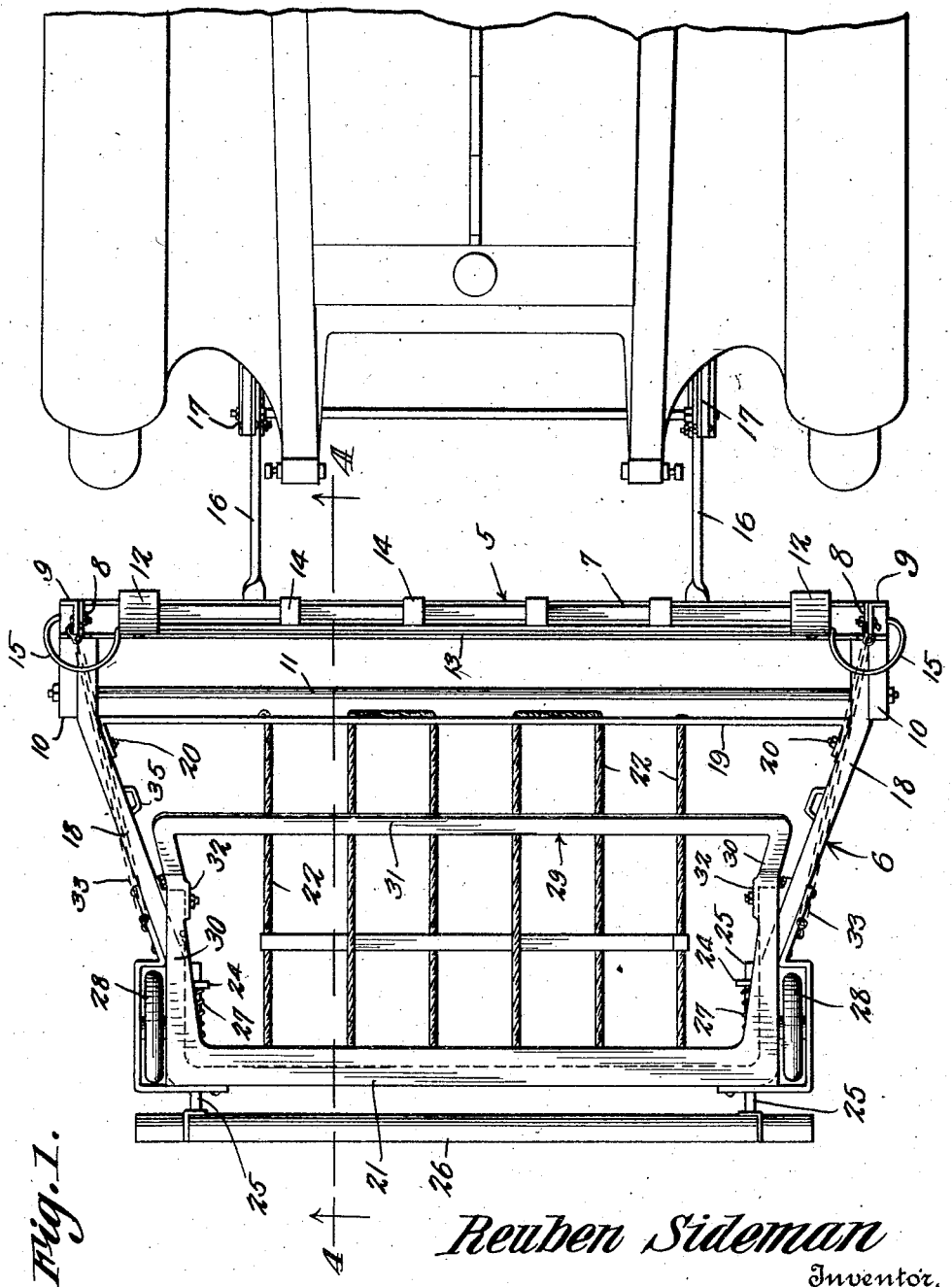

July 6, 1926.  1,591,407
R. SIDEMAN
AUTO FENDER
Filed March 17, 1926  3 Sheets-Sheet 3
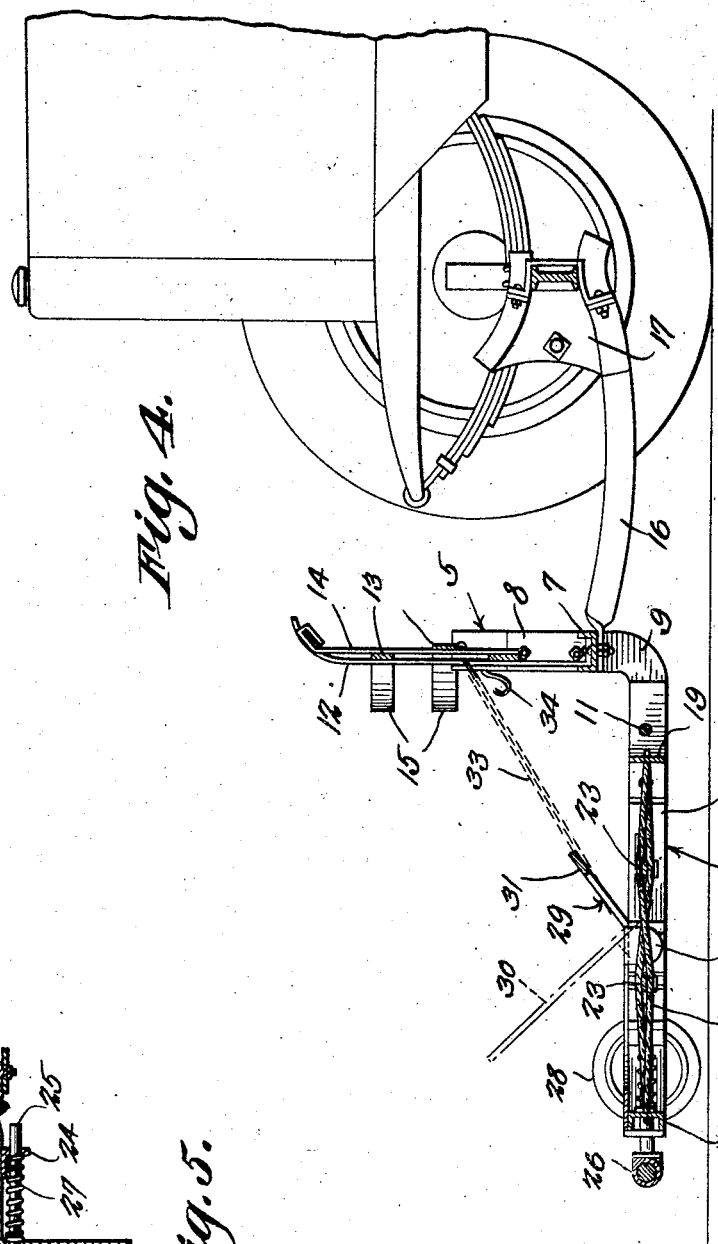
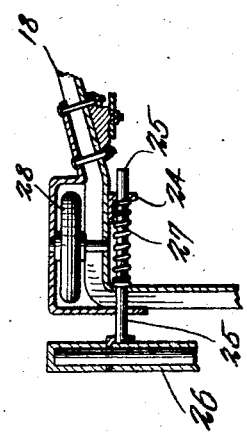
Reuben Sideman
Inventor
By C. A. Snow & Co.
Attorneys.

Patented July 6, 1926.

1,591,407

UNITED STATES PATENT OFFICE.

REUBEN SIDEMAN, OF SAN FRANCISCO, CALIFORNIA.

AUTO FENDER.

Application filed March 17, 1926. Serial No. 95,364.

This invention relates to fenders, and more particularly fenders especially designed for use on motor vehicles, the primary object of the invention being to provide means for picking up a person or object struck by the fender, in such a way as to insure against the person or object rolling from the fender.

Another object of the invention is to provide a movable or yieldingly supported bumper, at the forward portion of the fender to insure against damaging the article struck by the bumper and prevent injury to a person engaged by the bumper.

A further object of the invention is to provide a fender which may be readily and easily swung to its inactive position when it is not desirable to use the same.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view illustrating a bumper constructed in accordance with the invention as secured to a motor vehicle.

Figure 2 is a side elvational view thereof.

Figure 3 is a fragmental sectional view taken on line 3—3 of Figure 2.

Figure 4 is a sectional view taken on line 4—4 of Figure 1.

Figure 5 is a fragmental detail view illustrating the manner of supporting the bumper on the fender.

Referring to the drawings in detail, the fender includes a vertical rear section 5 and a forward section 6, the forward section having pivotal connection with the rear section to permit the forward section to be moved to a position as shown in dotted lines in Figure 2 so that the same may be thrown out of use when desired.

The rear section 5 or supporting section of the fender embodies a main supporting bar 7 which has upwardly extended finger portions 8 secured to the bracket members 9 which in turn have forwardly extended end portions 10 that are connected by the supporting rod 11 which supports the forward section 6, to be hereinafter more fully described.

The body portion of the section 5 includes vertical end members 12 secured at their lower ends to the bar 7, the upper ends thereof terminating at a point in proximity with the upper surfaces of the front mud guards of the vehicle, where they are curved rearwardly as shown by Figure 2.

Connecting the vertical end members 12 are bars 13 that are disposed in vertical spaced relation with each other, the bars 13 acting as supports for the vertical bars 14 so arranged that a person could not pass therebetween.

Forming a part of the rear section 5 are the curved guards 15 that are provided by bending the outer ends of the bars 13 which as shown by Figure 3, extend beyond the ends of the rear section.

Forwardly extended supporting arms 16 have connection with the rear section 5 and act to support the fender and secure the fender to the motor vehicle to which it is to be supplied.

Clamping members such as indicated at 17 are secured to the rear ends of the arms 16 and are designed to clamp around the front axle of the vehicle to rigidly secure the arms in position thereon. The forward section 6 of the fender embodies a frame including a channel bar constructed in such a way as to provide side members 18 that have pivotal connection with the rod 11, the side members extending inwardly and forwardly as shown by Figure 1 of the drawings.

A bar 19 connects the rear end of the side members 18 and has its ends secured to the side members 18 by means of bolts 20. Openings are formed in the bar 19 and forward bar 21 of the forward section, which openings receive the cables 22 that are laced therethrough, there being provided substantially light bars 23 connected with the cables to hold the cables rigid at all times.

Disposed laterally of the forward section and arranged adjacent to the forward end thereof, are bearings 24 in which the rods 25 move, which rods extend through openings in the forward bar 21 and have connection with the bumper 26 which is in the form of a bar covered with a shock absorbing medium such as rubber or the like.

Coiled springs 27 are arranged between the inner ends of the bearings 24 and the forward bar 21 of the forward section and are secured to the rods 25 in such a way as to normally extend them forwardly with the result that rearward movement of the bumper 26 is cushioned.

Wheels indicated at 28 are mounted at the forward end of the forward section 6, the wheels being constructed in such a way that normally they will not engage the ground surface over which the device is moving, but are provided for supporting the fender when weight causes the fender to sag. A pivoted guard frame indicated generally by the reference character 29 forms an important feature of the invention and as shown, includes curved end members 30 which end members are connected by means of the bars 31, the end members being formed with ears 32 which are apertured to receive a suitable securing bolt for pivotally supporting the frame 29.

Thus it will be seen that due to the construction of this frame 29, the frame will, when a person or object falls onto the forward section of the fender swing to a position as shown in dotted lines in Figure 4, and guard against a person falling from the fender.

Chains indicated at 33 connect the forward section of the fender to the rear section thereof, and transfer strain directed to the forward section by a person or object falling on the fender to the rear section of the fender.

Should it be desired to elevate the forward section to throw the same out of use, the hooks 34 may be passed through the eyes 35 as shown in dotted lines in Figure 2.

With the foregoing detail description, it is believed that a further detailed description as to the operation of the device is unnecessary.

I claim:

1. In a fender of the class described, a rear section, a forward section pivotally connected with the rear section, said rear section including vertical bars and transversely disposed bars, the ends of the transverse bars extending beyond the ends of the vertical rear section, said ends of the transversely disposed bars being curved rearwardly to provide guards, and wheels for supporting the forward section under the weight of an object falling thereon.

2. In a fender of the class described, a vertical rear section, means connected with the rear section for connecting the fender to the front axle of a motor vehicle, a forward section pivotally connected with the rear section, a bumper yieldingly supported by the forward section, said bumper extending beyond the forward edge of the forward section, and a guard frame mounted on the forward section.

3. In a fender of the class described, a vertical rear section, a forward section pivotally connected with the rear section, a pivoted guard frame mounted on the forward section and including a normally upstanding portion, said upstanding portion adapted to be struck by an object falling onto the forward section to throw the guard frame to its active position, and wheels carried by the forward section.

4. In a fender of the class described, a body portion, a pivoted guard frame including sections disposed at oblique angles with respect to each other, said guard frame being pivotally connected with the body portion, at points between the front and rear edges of the guard frame, and said guard frame adapted to move to its active position by the weight of an object falling thereon.

In testimony that I claim the foregoing as my own, I have hereto affixed my signature.

REUBEN SIDEMAN.